United States Patent
Mojica

(10) Patent No.: US 7,522,359 B2
(45) Date of Patent: Apr. 21, 2009

(54) WRITE MODE SERVO SCAN DIAGNOSTIC FOR MAGNETIC TAPE DATA STORAGE CARTRIDGE

(75) Inventor: Arturo Avila Mojica, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 11/208,484

(22) Filed: Aug. 18, 2005

(65) Prior Publication Data

US 2007/0041113 A1 Feb. 22, 2007

(51) Int. Cl.
*G11B 27/36* (2006.01)
(52) U.S. Cl. .................................... 360/31
(58) Field of Classification Search ............ 360/31, 360/39, 53, 60, 61, 77.12, 71, 75
See application file for complete search history.

(56) References Cited

U.S. PATENT DOCUMENTS

| | | | | |
|---|---|---|---|---|
| 4,413,328 A | 11/1983 | Videki, II | ............... | 364/900 |
| 5,416,914 A | 5/1995 | Korngiebel et al. | ......... | 395/425 |
| 5,872,672 A * | 2/1999 | Chliwnyj et al. | ......... | 360/77.12 |
| 6,023,709 A | 2/2000 | Anglin et al. | ............... | 707/204 |
| 6,198,594 B1 | 3/2001 | Utsumi et al. | ............... | 360/92 |
| 6,725,394 B1 | 4/2004 | Bolt | ............................... | 714/7 |
| 6,738,210 B1 | 5/2004 | Olson et al. | ................... | 360/53 |
| 6,741,182 B1 | 5/2004 | Smith et al. | ................ | 340/664 |
| 7,277,246 B2 * | 10/2007 | Barbian et al. | ................ | 360/69 |
| 2004/0153773 A1 | 8/2004 | Woo et al. | ..................... | 714/25 |

FOREIGN PATENT DOCUMENTS

| | | |
|---|---|---|
| EP | 1462928 | 9/2004 |
| JP | 3071467 A | 3/1991 |
| JP | 6251475 A | 9/1994 |
| JP | 2000048439 A | 2/2000 |
| JP | 2003297005 A | 10/2003 |

\* cited by examiner

*Primary Examiner*—Fred Tzeng
(74) *Attorney, Agent, or Firm*—John H. Holcombe

(57) ABSTRACT

A diagnostic for magnetic tape data storage drives and magnetic tape data storage cartridges comprises a magnetic tape data storage drive having more stringent servo error detection in write mode than in read mode. The magnetic tape data storage drive is set to a write mode, the write mode nominally for operating the write channel to write data while the track following servo apparatus detects and track follows the servo tracks of a magnetic tape; and scans the servo tracks of a magnetic tape in the write mode, but without writing data; detecting servo errors using criteria of the write mode; and logs information of the detected servo errors.

16 Claims, 4 Drawing Sheets

WRITE MODE SERVO SCAN DIAGNOSTIC FOR MAGNETIC TAPE DATA STORAGE CARTRIDGE

DOCUMENTS INCORPORATED BY REFERENCE

Commonly assigned U.S. Pat. No. 5,689,384, Albrecht et al., is incorporated for its showing of timing based magnetic tape servo tracks and servo detection for a magnetic tape data storage drive.

Commonly assigned U.S. Pat. No. 6,798,607, Chliwnyj et al., is incorporated for its showing of amplitude based magnetic tape servo tracks and servo detection for a magnetic tape data storage drive.

FIELD OF THE INVENTION

This invention relates to magnetic tape data storage cartridges, and, more particularly, to the reliability and serviceability of magnetic tape data storage cartridges.

BACKGROUND OF THE INVENTION

Magnetic tape data storage cartridges and the magnetic tape data storage drives which read and write data to the magnetic tape data storage cartridges are typically reliable means of providing long term storage of information. Data is written to a magnetic tape data storage cartridge by a magnetic tape data storage drive, the cartridge is typically removed from the drive and stored in a storage shelf of an automated data storage library and/or removed to a long term storage facility, and may at some subsequent time be read by another magnetic tape data storage drive. Should an application or applications not cycle through multiple drives, for example, all jobs start on the same drive, and if that drive is busy try the next, errors in the data transfer process, for example, from defective cartridges, will be concentrated in the first drive. Thus, the assumption may be made that the problem lies with the magnetic tape data storage drive, resulting in the replacement of the drive, with accompanying warranty expense by the drive supplier, and may result in replaced and returned drives having "no defect found". One approach is to interrupt the application experiencing data errors, to move cartridges that have evidenced errors from drive to drive, and test the cartridges in another drive. This approach is not necessarily appreciated by the user of the drives and cartridges.

SUMMARY OF THE INVENTION

Magnetic tape data storage drives, processors, service methods, and computer program products, are provided for providing diagnostic information regarding magnetic tape. The diagnostic information is with respect to a magnetic tape data storage drive having track following servo apparatus configured to detect and track follow servo tracks on magnetic tape, such that at least one magnetic tape read head and write head may read and/or write data with respect to the magnetic tape as a drive system moves the magnetic tape with respect to the magnetic tape read head(s) and write head(s).

Steps of an embodiment of the present invention comprise: setting the magnetic tape data storage drive to a write mode, the write mode nominally for operating the write channel(s) to write data while the track following servo apparatus detects and track follows the servo tracks of a magnetic tape; scanning the servo tracks of a magnetic tape in the write mode, but without writing data; detecting servo errors using criteria of the write mode; and logging information of the detected servo errors.

In a further embodiment of the present invention, the step of detecting servo errors comprises detecting servo errors which are sufficient under the write mode criteria to cause the magnetic tape data storage drive to stop writing.

Another embodiment of the present invention additionally comprises the step of recording the logged information of the detected servo errors to a housekeeping area of a magnetic tape data storage cartridge having the magnetic tape.

In still another embodiment of the present invention, the step of scanning the servo tracks comprises at least scanning of both the top-most and bottom-most servo tracking position in the servo tracks.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
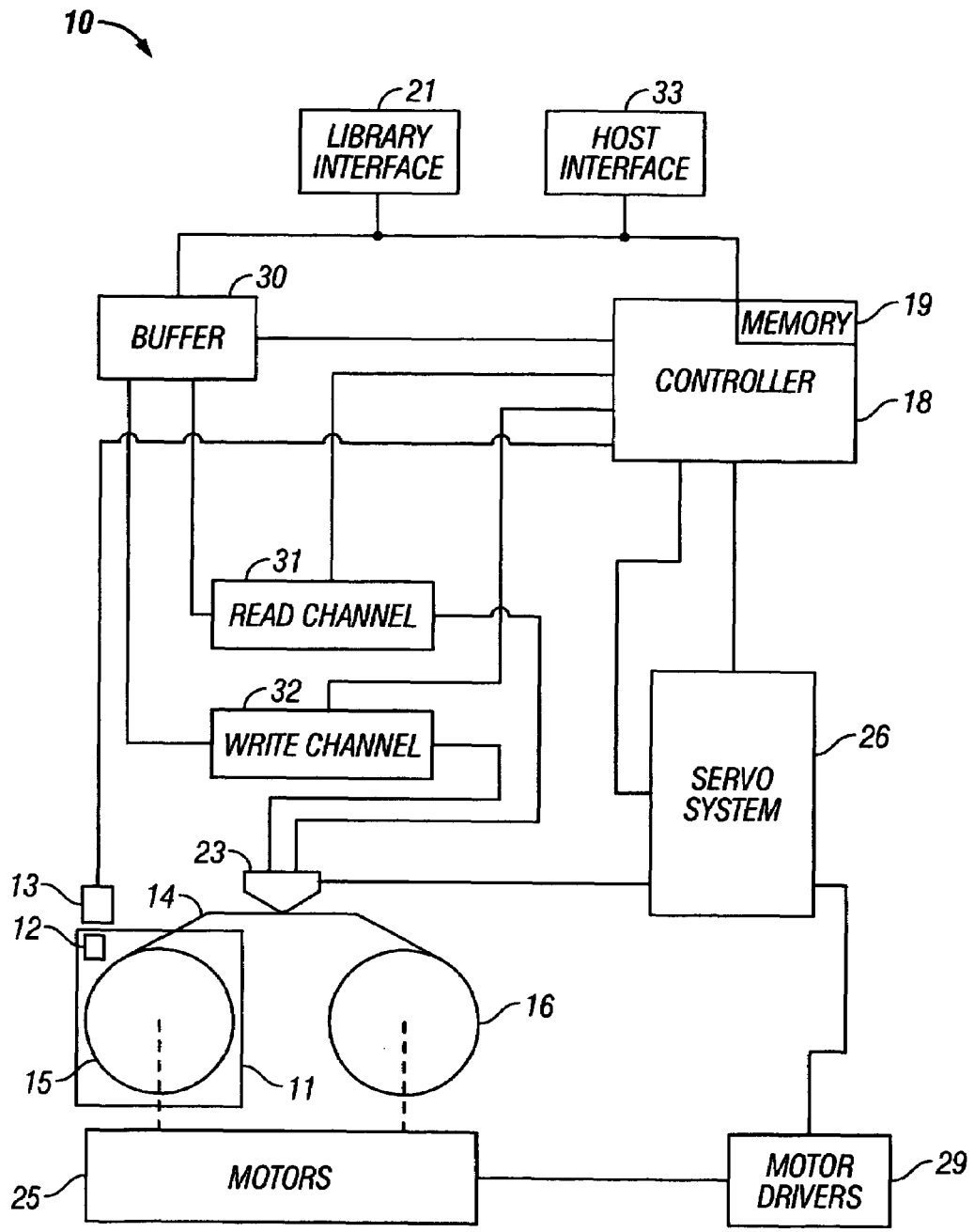
FIG. 1 is a block diagram of an embodiment of a magnetic tape data storage drive which may implement the present invention.

Referring to FIG. 1, a magnetic tape data storage drive 10 is illustrated which may implement aspects of the present invention. The magnetic tape data storage drive provides a means for reading and writing information with respect to a magnetic tape 14 of a magnetic tape data storage cartridge 11.

Magnetic tape data storage cartridges provide a means to store data on magnetic tape to be saved and read at a subsequent time. Further, the magnetic tape data storage cartridges may be interchanged between tape drives, such that a magnetic tape written on one tape drive will be read by another tape drive.

As is understood by those of skill in the art, a magnetic tape data storage cartridge 11 comprises a length of magnetic tape 14 wound on one or two reels 15, 16.

A single reel magnetic tape data storage cartridge 11 is illustrated, example of which are those adhering to the Linear Tape Open (LTO) format. An example of a magnetic tape data storage drive 10 is the IBM® 3580 Ultrium magnetic tape drive based on LTO technology. A further example of a single reel magnetic tape data storage drive and associated cartridge is the IBM® 3592 TotalStorage Enterprise magnetic tape drive and associated magnetic tape cartridge. An example of a dual reel cartridge is the IBM® 3570 magnetic tape cartridge and associated drive.

Also as is understood by those of skill in the art, a magnetic tape data storage drive 10 comprises one or more controllers 18 of a recording system for operating the magnetic tape drive in accordance with commands received at interface 21 or interface 33. A controller typically comprises logic and/or one or more microprocessors with a memory 19 for storing information and program information for operating the microprocessor(s). Herein "processor" may comprise any suitable logic, microprocessor, and associated memory for responding to program instructions, and the associated memory may comprise fixed or rewritable memory or data storage devices. The program information may be supplied to the controller or memory via the interface 21, via the interface 33, or by being read from a magnetic tape cartridge, or by any other suitable means. The magnetic tape data storage drive 10 may comprise a standalone unit or comprise a part of an automated data storage library or other subsystem. The magnetic tape data storage drive may be coupled to a host system directly, through a library, or over a network, and employ as interfaces 21 and/or 33 a Small Computer System Interface (SCSI), an optical fiber channel interface, etc.

The magnetic tape data storage cartridge 11 may be inserted in the magnetic tape data storage drive 10, and loaded by the tape drive so that one or more read and/or write tape heads 23 of the recording system reads and/or writes information in the form of signals with respect to the magnetic tape 14 as the tape is moved longitudinally by one or more motors 25 which rotate the reels 15, 16.

The magnetic tape data storage cartridge 11 may also comprise a cartridge memory 12 which stores information about the cartridge, for example, whether the cartridge has been initialized, and factory information about the cartridge, and may store housekeeping information. The magnetic tape data storage drive communicates with cartridge memory 12 by means of a wireless communication interface 13, to read and/or write information with respect to the cartridge memory, and further communicates with the drive controller 18.

Figure 2:
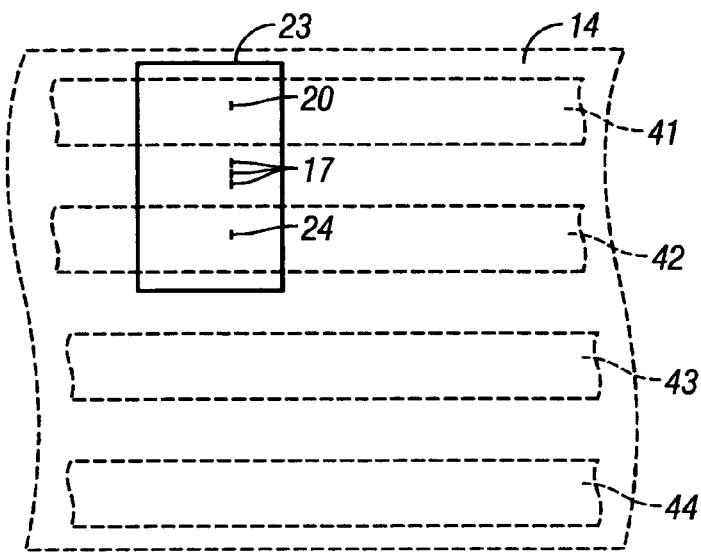
FIG. 2 is a diagrammatic illustration of a magnetic tape head of the magnetic tape data storage drive of FIG. 1 and of a segment of a magnetic tape with a plurality of servo tracks.

Referring additionally to FIG. 2, the magnetic tape 14 typically comprises a plurality of parallel tracks, or groups of tracks, separated by longitudinal servo tracks 41, 42, 43, and 44. In some formats, such as the LTO format, above, the tracks are arranged in a serpentine back and forth pattern of separate wraps, as is known to those of skill in the art. The tape head 23 typically comprises a number of separate elements which read and/or write data with respect to a number of parallel data tracks, as is provided with a separate servo transducer, or servo transducers 20, 24, which are laterally offset from the read and/or write elements 17, so that, as the servo transducers track follow the servo track, the read and/or write elements 17 are guided along the data track or tracks.

A servo system 26 of the magnetic tape data storage drive 10 of FIG. 1 moves the tape head 23 laterally with respect to the magnetic tape 14 both to access a track or group of tracks and to track follow the servo track to cause the read and/or write elements 17 to maintain alignment with the accessed data track or tracks. Also as known to those of skill in the art, a group of tracks may be called a "wrap" and the servo system may comprise a wrap control system to move the tape head 23 laterally to access a wrap, for example at BOT and EOT, and the servo system may also control the operation of the motors 25 through motor drivers 29, both in response to instructions by the controller 18.

Controller 18 also provides the data flow and formatter for data to be read from and written to the magnetic tape, employing a buffer 30, a read channel 31, and a write channel 32, as is known to those of skill in the art.

Figure 3:
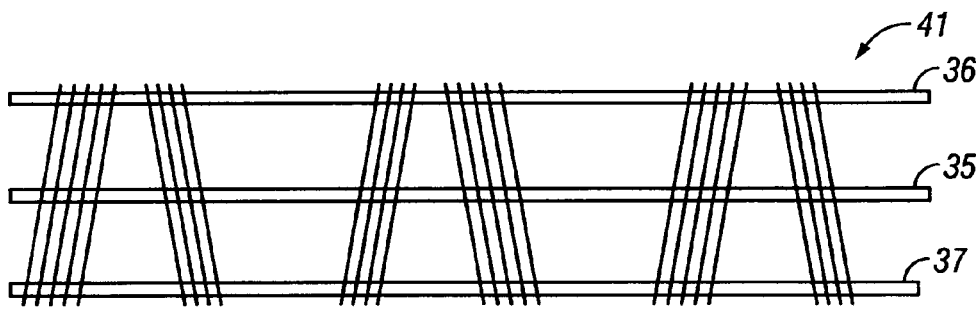
FIG. 3 is a representation of a servo transducer as it tracks one of the servo tracks of FIG. 2, along with a representation of the servo output signal it generates and the corresponding signal intervals.
Figure 3:
Figure 3:
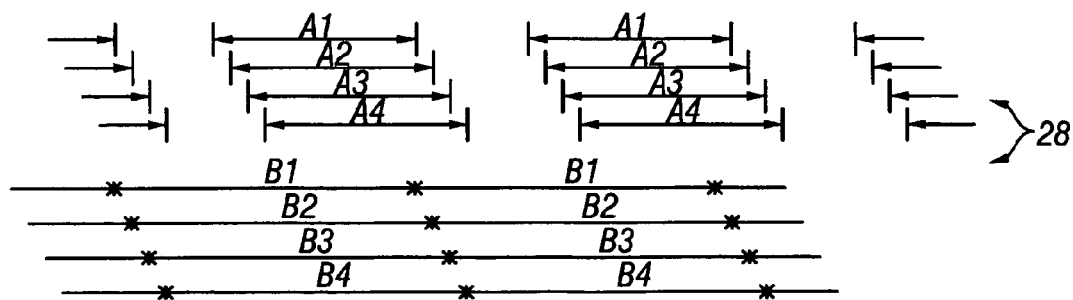

Referring additionally to FIG. 3, the drive system comprising at least motors 25, motor drivers 29, and reels 15, 16 moves a magnetic tape 14 longitudinally with respect to the tape head 23 such that the servo transducer 20 will trace a path 35 as the servo transducer tracks one of the servo tracks of FIG. 2, e.g. servo track 41. The exemplary servo track illustrated in FIG. 3 is of the type described in the incorporated U.S. Pat. No. 5,689,384, which comprises patterns of transitions recorded at more than one azimuthal orientation across the width of the servo track, and which are therefore non-parallel. The timing 28 of the signal 27 derived from reading at any point across the width of such a pattern varies continuously as the servo transducer 20 is moved laterally across the servo track, since the servo transducer 20 is small compared to the width of the servo pattern. Lateral position sensing is achieved by deriving a ratio of two servo pattern intervals A and B of FIG. 3 and therefore is insensitive to tape speed.

A servo system may provide the ability to seek and track follow separate servo tracking positions. For example, in FIG. 3, path 35 represents one of several separate servo tracking positions, and path 36 represents the top-most of the separate servo tracking positions, and path 37 represents the bottom-most servo tracking position.

Information may also be encoded into the servo information, as is known to those of skill in the art, such as longitudinal positioning information.

The servo system 26 of FIG. 1 may alternatively comprise any suitable alternative system for providing a lateral track following capability, as are known to those of skill in the art, such as amplitude based systems, for example, as discussed in the incorporated U.S. Pat. No. 6,798,607.

Any offset from the desired position of the servo transducer 20 is called a positioning error and the servo signal of this offset is called a Positioning Error Signal (PES). The servo system thus attempts to drive the PES to a desired value, and thereby accurately track follow the servo track. Servo tracks, whether timing based or amplitude based, may implement several servo tracking positions across a single servo track. As discussed above, separate servo tracking positions may comprise a center servo tracking position 35, a top-most servo tracking position 36, a bottom-most servo tracking position 37, and one or more intermediate servo tracking positions in each track.

Typically, errors in track following are treated differently between the read channel 31 and the write channel 32, since a read action does not affect the data present on the magnetic tape 14, while a write operation that goes off-track runs the risk of overwriting existing data on adjacent tracks. Thus, the criteria for flagging a servo error in a write operation is more critical than the criteria used in a read operation, and the magnetic tape drive may be configured to detect servo errors which are significant enough to risk overwriting adjacent tracks, such as servo signals which are discontinous or not correctly read, and therefore cause the magnetic tape data storage drive to stop writing. Such servo errors may result from defects in the magnetic tape, from a poor signal by the servo transducer, or from other causes with the drive or with the magnetic tape, as are understood by those of skill in the art. Examples of servo errors comprise low amplitude servo signals, positioning error signals (PES) which are outside expected parameters, longitudinal positioning (LPOS) errors that are not read or are outside expected parameters, etc. In write mode, the errors may be sufficiently significant to cause the magnetic tape data storage drive to stop writing.

Figure 4:
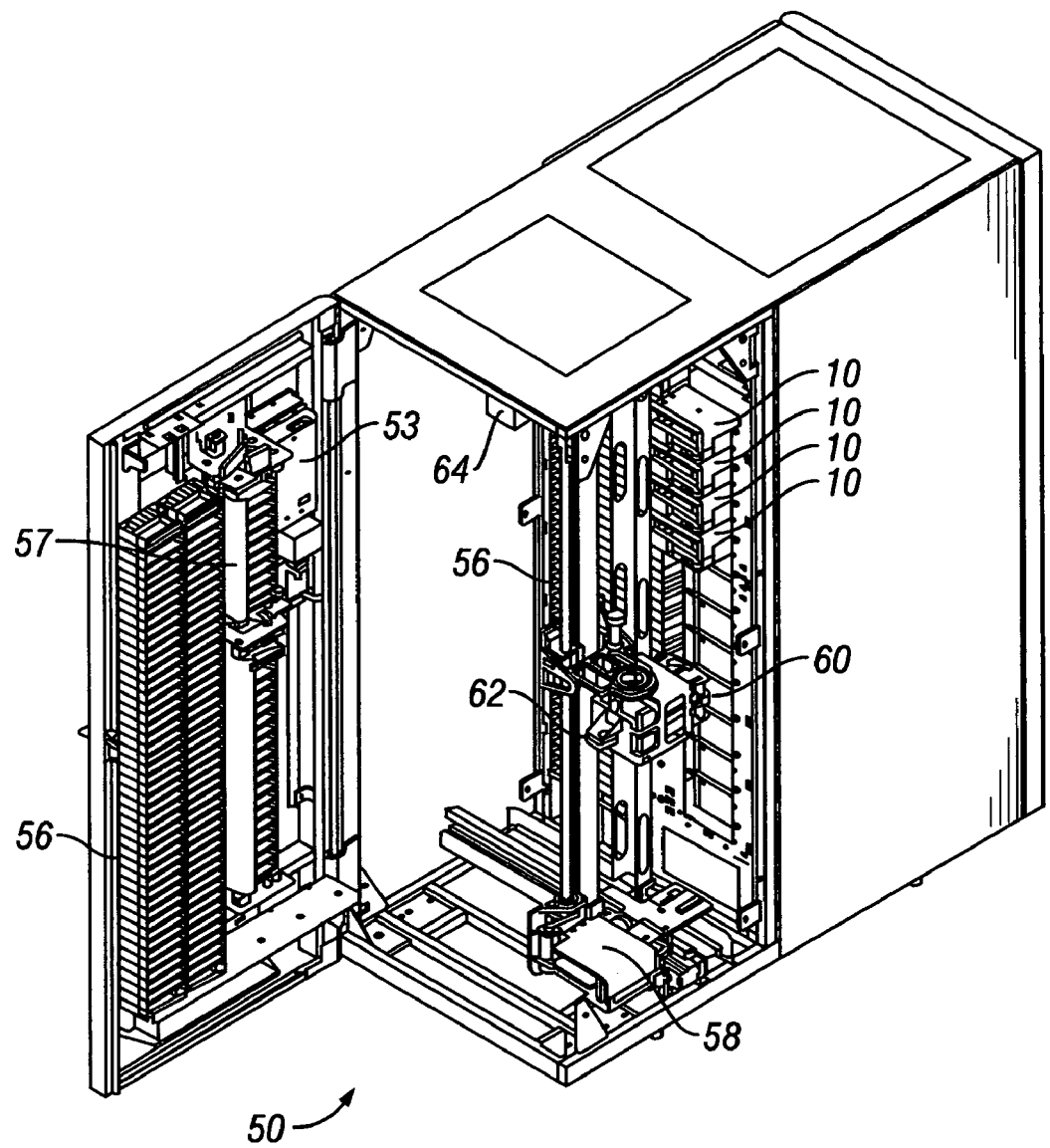
FIG. 4 is an isometric illustration of an automated data storage library having a plurality of magnetic tape data storage drives of FIG. 1.

Referring to FIG. 4, an embodiment of an automated data storage library 50 is illustrated which is configured to access data storage media, such as magnetic tape cartridges, and comprises a plurality of storage shelves 56 for storing the magnetic tape cartridges, and a plurality of magnetic tape data storage drives 10 for reading and/or writing data with respect to the magnetic tape cartridges. The library 50 further comprises at least one robot accessor 58 for transporting the magnetic tape cartridges between the storage shelves 56 and the magnetic tape data storage drives 10. The robot accessor 58 comprises a gripper assembly 60 for gripping one or more magnetic tape cartridges, and may comprise an accessor sensor 62 to read identifying information about the magnetic tape cartridges or about the library.

The library 50 also comprises one or more control modules 64 to operate the library, and communicate with a host system or host systems, and may communicate with the magnetic tape data storage drives 10, e.g. at interface 21 of FIG. 1. Alternatively, the magnetic tape data storage drives 10 may communicate with a host system or systems directly and the library to host system or systems may be through the tape drive communication, e.g. at interface 33 of FIG. 1. The control module may also comprise a user interface, such as a web based interface, which allows a user to interact with the library. Further, the library may provide an operator panel 53 for communicating with the library control module(s). An example of an automated data storage library comprises the IBM® 3584 tape library, and another example of an automated data storage library comprises the IBM® 3594 tape library.

As discussed above, an error detected in reading or writing a magnetic tape cartridge may result from a defect in the magnetic tape or the magnetic tape data storage drive. An application or applications of an automated data storage library 50 of FIG. 4, or any application using multiple drives outside of a library, may not cycle through multiple drives 10. For example, all jobs start on the same drive, and if that drive is busy try the next. In that case, errors in the data transfer process, for example, from defective cartridges, will be concentrated in the first drive. Thus, the assumption may be made that the problem lies with the magnetic tape data storage drive, resulting in the replacement of the drive, and warranty expense by the drive supplier, and may result in replaced and returned drives having "no defect found".

In accordance with an embodiment of the present invention, the magnetic tape data storage drives 10 of FIG. 1 is configured to, in write mode, operate the write channel 32 and the servo system 26 to write data while the track following servo apparatus detects and track follows the servo tracks of a magnetic tape 14; and the magnetic tape data storage drive is additionally configured to scan the servo tracks of a magnetic tape in the write mode, but without writing data, and to detect servo errors using criteria of the write mode; and also configured to log information of the detected servo errors, for example, in memory 19.

Figure 5:
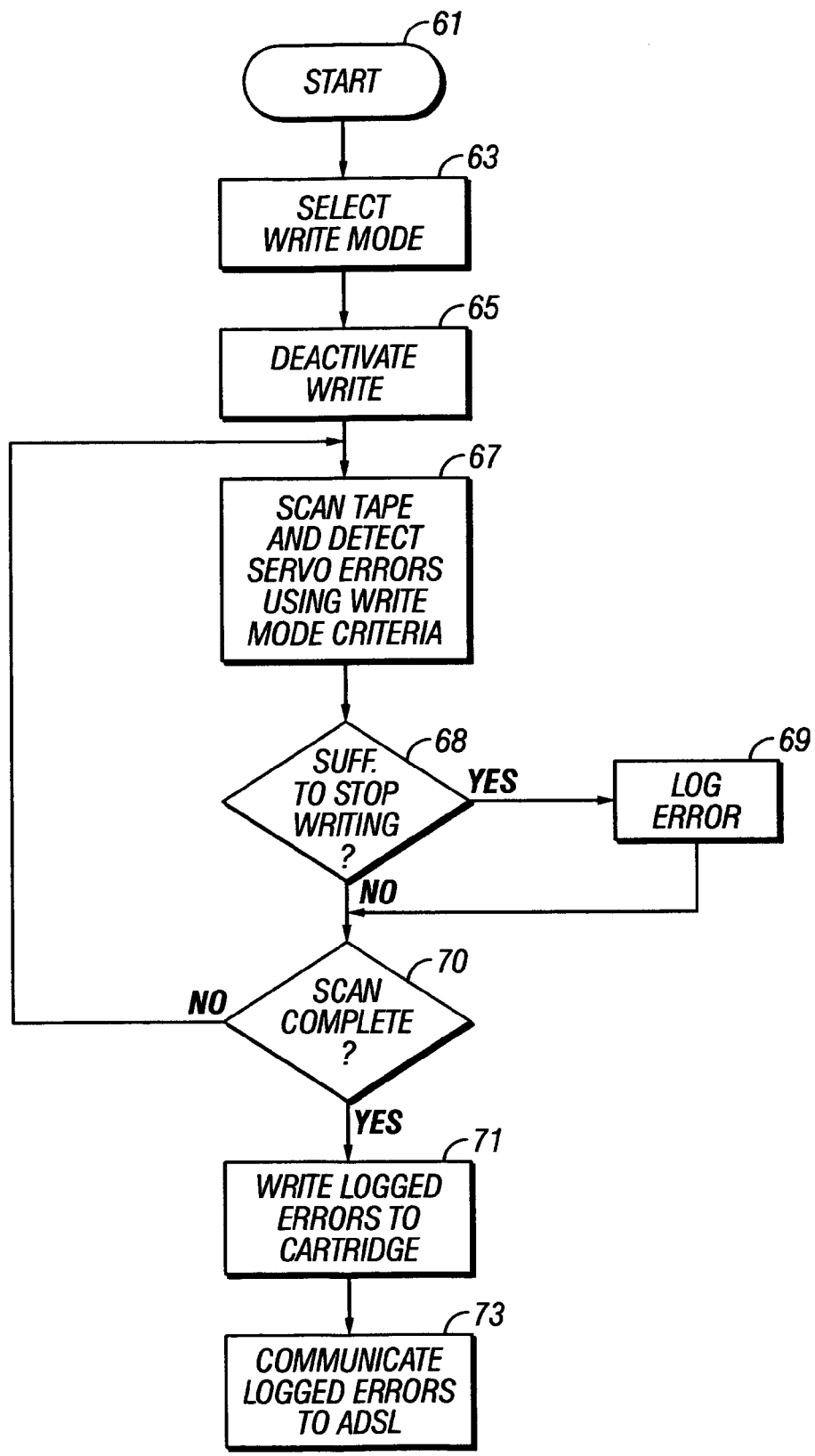
FIG. 5 is a flow chart depicting embodiments of methods in accordance with the present invention.

Referring to FIGS. 1 and 5, an embodiment of a method in accordance with the present invention is initiated at step 61, for example, each time a magnetic tape cartridge 11 is initialized by the magnetic tape data storage drive. The initialization process may be initiated by a host application, e.g. over interface 33, or by an application of the automated data storage library, or by an operator, e.g. at operator panel 53, and provided over interface 21. For example, the initialization or initial use of a magnetic tape cartridge may be referred to as "Time Zero (T0)" use. In step 63, the controller 18 selects a write mode for the magnetic tape drive, which is nominally to operate the write channel 32 and the servo system 26 to write data while the track following servo apparatus detects and track follows the servo tracks of a magnetic tape 14. However, in step 65, controller 18 deactivates the write operation, such that the magnetic tape data storage drive is configured to not write the data tracks even though it is in write mode. For example, the "write enable" signal is disabled and data verification is turned off. Steps 63 and 65 may alternatively comprise a single step of selecting a special non-writing mode while retaining the servo error detection characteristics in a write mode.

Thus, in the write mode of steps 63 and 65, media and servo parameters are set to the actual used for write operations.

In step 67, the controller operates the magnetic tape data storage drive to scan the servo tracks of a magnetic tape in the write mode without writing data. In this mode, the track following servo apparatus 26 detects and track follows the servo tracks of a magnetic tape 14, and detects servo errors using criteria of the write mode. The write mode criteria typically are tougher than the read criteria. The write criteria may have several components, and one of them is for the Positioning Error Signal (PES). Whenever a PES error occurs, the drive needs to stop writing in order to avoid overwriting adjacent tracks, as discussed above, and to skip some distance forward, or conduct one or more error recovery procedures (ERP) and attempt to write the data again. A typical PES error comprises a servo signal discontinuity, and may result from embossments, signal drop outs, creases, z-folds, or edge damage, many of which can be identified from an error recovery procedures. Typically, the write mode sets a threshold for the number of correctable errors, and flags an error if the threshold is met or exceeded. Additional write mode criteria may be practiced by those of skill in the art.

Herein, such errors are termed "servo errors".

In step 68, a determination is made whether a detected servo error or detected servo errors are sufficiently significant that the system would, if the write channel 32 were writing data, writing would be stopped. An example is a PES error discussed above, where the write channel would stop writing due to the risk of overwriting adjacent tracks. If the servo error is sufficiently significant, in step 69, the servo error is logged. Alternatively, all servo errors may be logged in step 69, and step 68 omitted, or used to add a flag or other indication of the type or importance to the logged servo errors. Step 70 checks whether the scan is complete, and if not, returns to step 67 to continue the scan, for example, on another wrap. Step 70 provides the ability to continue scanning the servo tracks of the magnetic tape, for example, comprising scanning from the "beginning of tape" (BOT) to the "end of tape" (EOT) a number of times, both on separate servo tracks, and on separate servo tracking positions such that both the topmost 36 and bottom-most 37 servo tracking position in each track is scanned.

The servo errors are logged, in step 69, for example, in the memory 19 of the controller 18. In step 71, the diagnostic information of logged servo errors, or a version of the logged servo errors, are written to an area of the magnetic tape data storage cartridge 11, for example, which has been set aside for non-data "housekeeping" information. This is accomplished by the drive positioning the magnetic tape at the beginning of the housekeeping region, and writing the diagnostic information at an appropriate portion of the housekeeping area. Thus, the diagnostic information regarding that cartridge can be maintained in the cartridge, and made available in case the diagnostic servo history of the cartridge is reviewed in the future. For example, subsequent drives may read the housekeeping recorded information and provide it in a dump operation if a failure occurs and used for the purpose of failure analysis. In addition, or alternatively, the housekeeping information may be provided by the wireless interface 13 to the cartridge memory 12, and maintained in the cartridge. In step 73, the diagnostic information of logged servo errors, or a version of the logged servo errors, are communicated, for example, to a host application over interface 33, or over interface 21 to the automated data storage library 50 of FIG. 4, for example, to controller 64. In this manner, the host application software or the library 50 can track the servo errors for each of the drives 10, and/or for each of the cartridges.

The method of the present invention comprises a service of providing diagnostic information, and may be implemented in any suitable form, one of which comprises a computer program product that is provided to a programmable computer processor, such as a controller 18 of FIG. 1. The computer program product may comprise firmware of a PROM, may be stored in memory, and/or provided to the magnetic tape data storage drive from the automated data storage library or a host system at interface 21 or at interface 33, from a magnetic tape cartridge, or by other means.

Those of skill in the art will understand that changes may be made with respect to the ordering of the steps of FIG. 5. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for providing the service of providing diagnostic information regarding magnetic tape, for a magnetic tape data storage drive having track following servo apparatus configured to detect and track follow servo tracks on magnetic tape, such that at least one magnetic tape read head and write head may read and/or write data with respect to said magnetic tape as a drive system moves said magnetic tape with respect to said at least one magnetic tape read head and write head; said method comprising the steps of:

setting said magnetic tape data storage drive to a write mode, said write mode nominally for operating said at least one write channel and said track following servo apparatus to write data while detecting and track following said servo tracks of a magnetic tape;

while nominally in said write mode, deactivating write operation of said at least one write channel;

scanning said servo tracks of a magnetic tape in said nominal write mode while said write operation is deactivated;

detecting servo errors using criteria of said write mode, said write mode criteria being more critical than criteria used in a read operation; and logging information of said detected servo errors.

2. The method of claim 1, wherein said step of detecting servo errors comprises detecting servo errors which are sufficient in write mode to cause said magnetic tape data storage drive to stop writing.

3. The method of claim 2, additionally comprising the step of recording said logged information of said detected servo errors to a housekeeping area of a magnetic tape data storage cartridge having said magnetic tape.

4. The method of claim 2, wherein said scanning of said servo tracks comprises at least scanning of both the top-most and bottom-most servo tracking position in said servo tracks.

5. A magnetic tape data storage drive, comprising:

at least one magnetic tape read head and write head;

a drive system configured to move a magnetic tape with respect to said at least one magnetic tape read head and write head;

track following servo apparatus configured to detect and track follow servo tracks on magnetic tape, such that said at least one magnetic tape read head and write head may read and/or write data with respect to said magnetic tape as said drive system moves said magnetic tape with respect to said at least one magnetic tape read head and write head;

at least one read channel;

at least one write channel;

said magnetic tape data storage drive configured to, in write mode, operate said at least one write channel and said track following servo apparatus to write data while detecting and track following said servo tracks of a magnetic tape;

said magnetic tape data storage drive additionally configured to, while nominally in said write mode, deactivate write operation of said at least one write channel; and said magnetic tape data storage drive additionally configured to scan said servo tracks of a magnetic tape in said norminal write mode, while said write operation is deactivated, and to detect servo errors using criteria of said write mode, said write mode criteria being more critical than criteria used in a read operation; and also configured to log information of said detected servo errors.

6. The magnetic tape data storage drive of claim 5, configured to detect servo errors comprising servo errors which are sufficient in write mode to cause said magnetic tape data storage drive to stop writing.

7. The magnetic tape data storage drive of claim 6, configured to record said logged information of said detected servo errors to a housekeeping area of a magnetic tape data storage cartridge having said magnetic tape.

8. The magnetic tape data storage drive of claim 6, configured to scan of said servo tracks comprising at least scanning of both the top-most and bottom-most servo tracking position in said servo tracks.

9. A computer program product embodied on a computer readable medium, configured to operate at least one programmable computer processor to provide diagnostic information regarding magnetic tape, for a magnetic tape data storage drive having track following servo apparatus configured to detect and track follow servo tracks on magnetic tape, such that at least one magnetic tape read head and write head may read and/or write data with respect to said magnetic tape as a drive system moves said magnetic tape with respect to said at least one magnetic tape read head and write head; comprising:

computer readable program code causing said at least one programmable computer processor to set said magnetic tape data storage drive to a write mode, said write mode nominally for operating said at least one write channel and said track following servo apparatus to write data while detecting and track following said servo tracks of a magnetic tape;

computer readable program code causing said at least one programmable computer processor to, while nominally in said write mode, deactivate write operation of said at least one write channel;

computer readable program code causing said at least one programmable computer processor to scan said servo tracks of a magnetic tape in said nominal write mode while said write operation is deactivated;

computer readable program code causing said at least one programmable computer processor to detect servo errors using criteria of said write mode, said write mode criteria being more critical than criteria used in a read operation; and computer readable program code causing said at least one programmable computer processor to log information of said detected servo errors.

10. The computer program product of claim 9, wherein said computer readable program code causes said at least one programmable computer processor to detect servo errors comprising detecting servo errors which are sufficient in write mode to cause said magnetic tape data storage drive to stop writing.

11. The computer program product of claim 10, additionally comprising computer readable program code causing said at least one programmable computer processor to record said logged information of said detected servo errors to a housekeeping area of a magnetic tape data storage cartridge having said magnetic tape.

12. The computer program product of claim 10, wherein said scan of said servo tracks comprises at least scanning of both the top-most and bottom-most servo tracking position in said servo tracks.

13. A processor configured to operate a magnetic tape data storage drive, said magnetic tape data storage drive having track following servo apparatus configured to detect and track follow servo tracks on magnetic tape, such that at least one magnetic tape read head and write head may read and/or write data with respect to said magnetic tape as a drive system moves said magnetic tape with respect to said at least one magnetic tape read head and write head; said processor configured to operate said magnetic tape data storage drive to execute the steps of:

setting said magnetic tape data storage drive to a write mode, said write mode nominally for operating said at least one write channel and said track following servo apparatus to write data while detecting and track following said servo tracks of a magnetic tape;

while nominally in said write mode, deactivating write operation of said at least one write channel;

scanning said servo tracks of a magnetic tape in said nominal write mode while said write operation is deactivated;

detecting servo errors using criteria of said write mode said write mode criteria being more critical than criteria used in a read operation; and logging information of said detected servo errors.

14. The processor of claim 13, configured to operate said magnetic tape data storage drive to execute said step of detecting servo errors comprising detecting servo errors which are sufficient in write mode to cause said magnetic tape data storage drive to stop writing.

15. The processor of claim 14, additionally configured to operate said magnetic tape data storage drive to execute the step of recording said logged information of said detected servo errors to a housekeeping area of a magnetic tape data storage cartridge having said magnetic tape.

16. The processor of claim 14, wherein said scanning of said servo tracks comprises at least scanning of both the top-most and bottom-most servo tracking position in said servo tracks.

* * * * *